(12) United States Patent
Tsuchihashi et al.

(10) Patent No.: US 11,538,377 B2
(45) Date of Patent: Dec. 27, 2022

(54) ELECTRONIC DEVICE HAVING CONNECTORS ON RIGID FLEXIBLE BOARD

(71) Applicant: Lenovo (Singapore) Pte. Ltd., Singapore (SG)

(72) Inventors: Moriyuki Tsuchihashi, Kanagawa (JP); Xiao Limin, Kanagawa (JP); Kazuo Fujii, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 58 days.

(21) Appl. No.: 17/183,453

(22) Filed: Feb. 24, 2021

(65) Prior Publication Data

US 2022/0172655 A1    Jun. 2, 2022

(30) Foreign Application Priority Data

Dec. 1, 2020    (JP) .............................. JP2020-199291

(51) Int. Cl.
*G09G 3/00* (2006.01)
*G09G 3/3233* (2016.01)

(52) U.S. Cl.
CPC ........... *G09G 3/035* (2020.08); *G09G 3/3233* (2013.01); *G09G 2300/0408* (2013.01); *G09G 2300/0842* (2013.01)

(58) Field of Classification Search
CPC ................ G09G 3/035; G09G 3/3233; G09G 2300/0408; G09G 2300/0842; G09G 3/2092; G09G 3/20; G09G 3/3241; H01Q 1/2266; H01L 23/5389; G02F 1/134309; H05K 1/148

See application file for complete search history.

(56) References Cited

U.S. PATENT DOCUMENTS

| 2004/0263442 | A1* | 12/2004 | Shingai | G09G 3/3241 |
| | | | | 345/76 |
| 2017/0061858 | A1* | 3/2017 | Kim | G09G 3/2092 |
| 2017/0132972 | A1* | 5/2017 | Tsuchida | G09G 3/3233 |
| 2017/0160827 | A1* | 6/2017 | Nakase | H05K 1/148 |

(Continued)

FOREIGN PATENT DOCUMENTS

| JP | 2009-300854 A | 12/2009 |
| JP | 2013-089302 A | 5/2013 |

(Continued)

*Primary Examiner* — Richard J Hong
(74) *Attorney, Agent, or Firm* — Osha Bergman Watanabe & Burton LLP

(57) ABSTRACT

An electronic device includes a first chassis, a second chassis rotatably connected to the first chassis through a hinge, a display having an organic light-emitting diode (OLED) panel stored in the first chassis, and a control board stored in the second chassis and mounted with a control unit that controls driving of the OLED panel and a first connector. The display includes a Flexible Printed Circuit (FPC) that electrically connects the OLED panel and the control board, and a non-volatile memory that stores first correction data based on an initial state of each pixel of the OLED panel and second correction data based on a usage status of each of the pixels of the OLED panel. The display also includes a second connector connected to the first connector.

3 Claims, 4 Drawing Sheets

(56) References Cited

U.S. PATENT DOCUMENTS

| | | | | |
|---|---|---|---|---|
| 2018/0061869 A1* | 3/2018 | Suzuki | ............... | G02F 1/134309 |
| 2020/0176386 A1* | 6/2020 | Ham | .................... | H01L 23/5389 |
| 2021/0082335 A1* | 3/2021 | Sun | ........................ | G09G 3/20 |
| 2021/0175608 A1* | 6/2021 | Ramasamy | ........... | H01Q 1/2266 |

FOREIGN PATENT DOCUMENTS

| | | |
|---|---|---|
| JP | 2014-206814 A | 10/2014 |
| JP | 2019-164775 A | 9/2019 |
| WO | 2019/043825 A1 | 3/2019 |

* cited by examiner

ELECTRONIC DEVICE HAVING CONNECTORS ON RIGID FLEXIBLE BOARD

TECHNICAL FIELD

The present invention relates to an electronic device.

BACKGROUND

Japanese Unexamined Patent Application Publication No. 2009-300854 discloses an electronic device employing an OLED (Organic Light Emitting Diode) for a display.

In order to display a desired image on the OLED, it is required to store correction data per pixel in a non-volatile memory and control a driving condition (for example, current value) of each pixel.

When the electronic device is maintained, the OLED and the non-volatile memory may be removed together from the electronic device because the correction data is created for each OLED. Depending on structures of the electronic device, maintenance work as described above was sometimes difficult to do.

SUMMARY

One or more embodiments of the present invention provide an electronic device that employs an OLED for a display where a maintenance workability of the electronic device is improved.

According to one or more embodiments, an electronic device according to one aspect of the present invention includes a first chassis, a second chassis rotatable connected to the first chassis through a hinge mechanism, a display unit having an OLED panel stored in the first chassis, and a control board stored in the second chassis and mounted with a control unit configured to control driving of the OLED panel and a first connector, in which the display unit has an FPC configured to electrically connect the OLED panel and the control board, a non-volatile memory configured to store first correction data based on an initial state and second correction data based on a usage status, pertaining to each pixel of the OLED panel, and a second connector to be connected to the first connector.

According to the above-described aspect, it becomes possible to remove the display unit including the OLED panel and the non-volatile memory without removing the control board from the electronic device, by disconnecting the first connector and the second connector. Maintenance workability can therefore be improved.

In this regard, the display unit may have a board mounted with the non-volatile memory and the second connector, and the board may be stored in the second chassis.

In addition, the FPC and the board may be an integrally formed rigid flexible board.

According to the above-described aspect of the present invention, it is possible to improve maintenance workability of the electronic device employing an OLED for a display.

DETAILED DESCRIPTION

Hereinafter, the electronic device according to the present embodiment is described based on the drawings.

Figure 1:
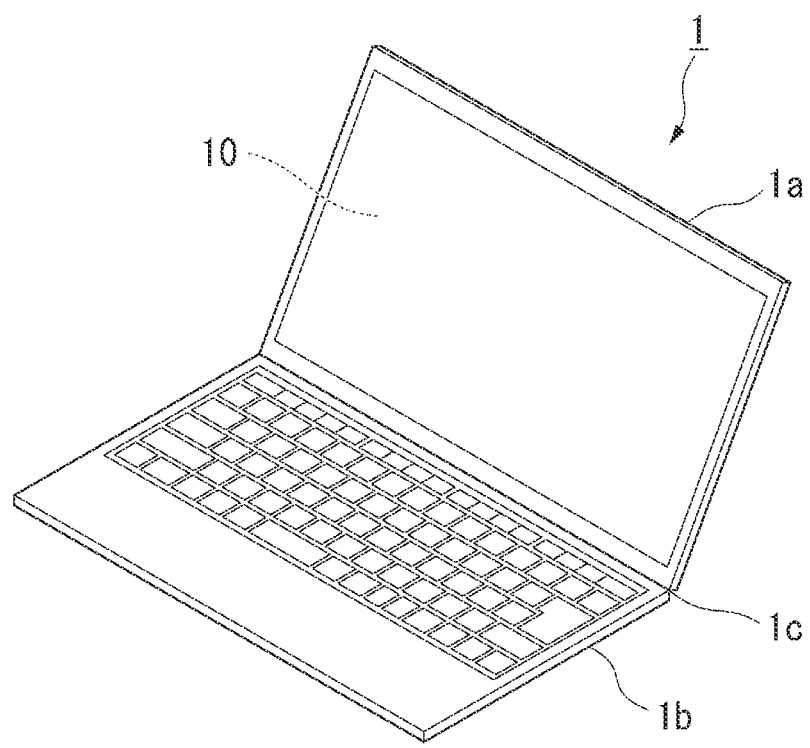
FIG. 1 is a view illustrating one example of an electronic device including a display unit according to the present embodiment.

An electronic device 1 illustrated in FIG. 1 is a clamshell type (laptop) PC (personal computer). The electronic device 1 includes a first chassis 1a, a second chassis 1b, and a hinge mechanism 1c. The first chassis 1a and the second chassis 1b are relatively rotatable about the hinge mechanism 1c. In the first chassis 1a, an OLED (Organic Light Emitting Diode) panel 12 (refer to FIG. 2) of a display unit 10 is stored. In the second chassis 1b, a keyboard and a mother board etc. are provided.

Figure 2:
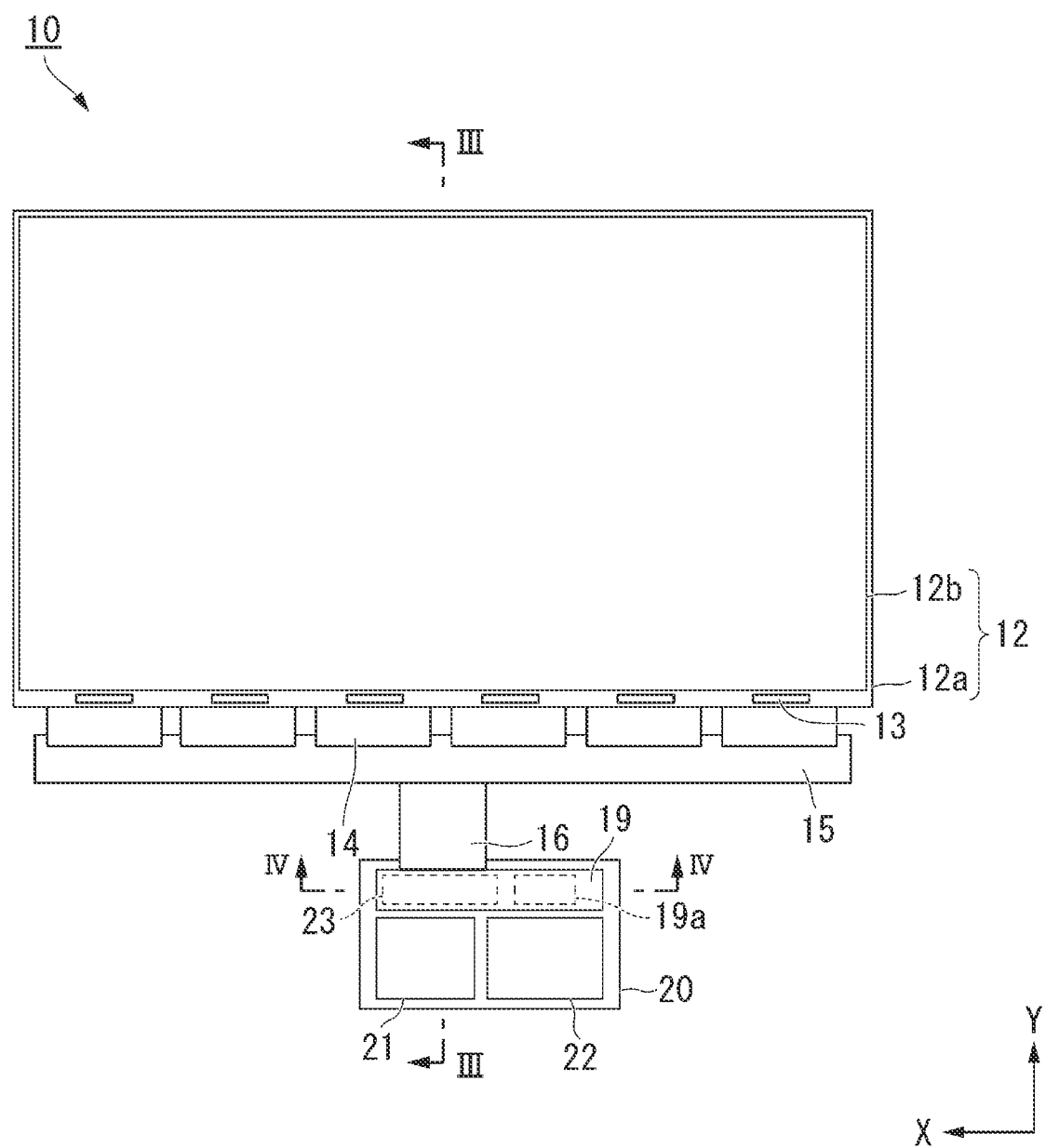
FIG. 2 is a view illustrating the display unit according to the present embodiment.
Figure 3:
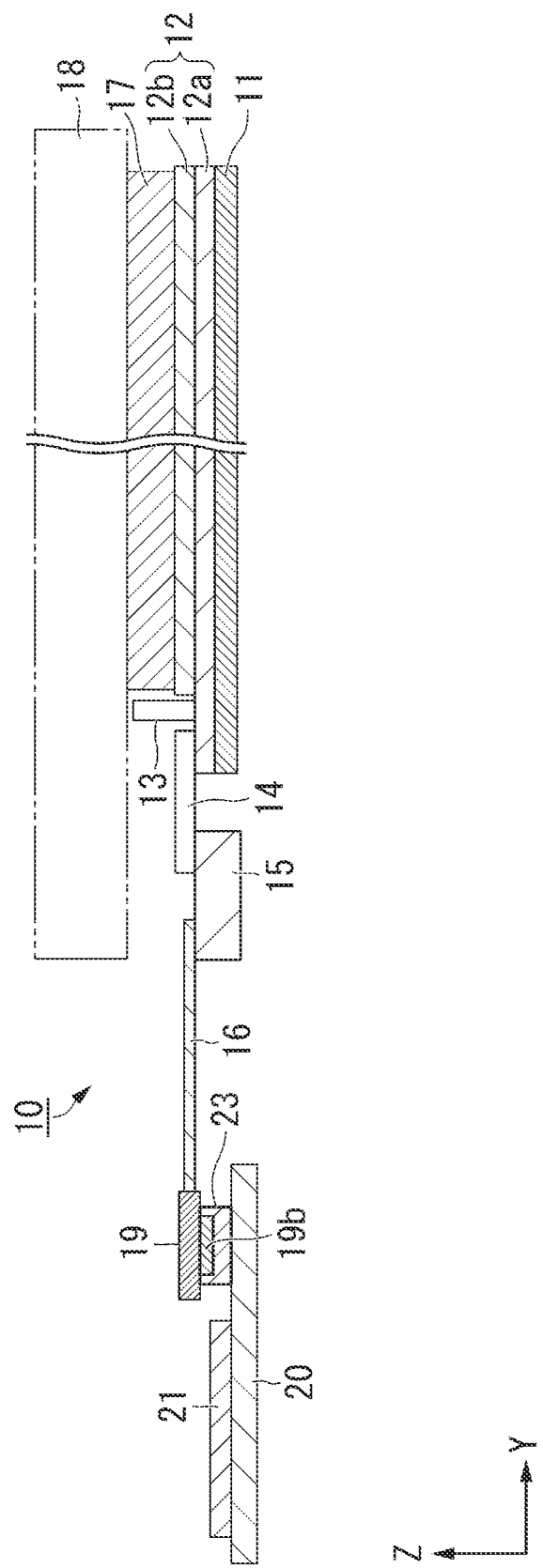
FIG. 3 is a cross-sectional view along an arrow III-III in FIG. 2.

As illustrated in FIG. 2 and FIG. 3, the display unit 10 includes a back sheet 11, the OLED panel 12, a plurality of driver chips 13, a plurality of connecting boards 14, a relay board 15, an FPC (Flexible Printed Circuit) 16, and a board 19. The display unit 10 may include one driver chip 13 and one connecting board 14.

(Definition of Direction)

In the present embodiment, a thickness direction of the OLED panel 12 is simply referred to as a thickness direction Z and represented by a Z-axis in the drawings. One direction orthogonal to the thickness direction Z is referred to as a first direction X and represented by an X-axis in the drawings. A direction orthogonal to both the thickness direction Z and the first direction X is referred to as a second direction Y and represented by a Y-axis in the drawings. That is, the OLED panel 12 extends in the first direction X and the second direction Y.

As illustrated in FIG. 2, the OLED panel 12 has a rectangular shape that is longer in the first direction X than in the second direction Y, when viewed from the thickness direction Z. However, a shape of the OLED panel 12 may be changed as appropriate. The OLED panel 12 has a display board 12a and an image display region 12b. The display board 12a is transparent and also referred to as a back plate or a back film. The display board 12a may be resin or glass. When the display board 12a is formed of flexible resin such as polyimide, it is possible to make the OLED panel 12 have flexibility. A predetermined circuit pattern is formed on the display board 12a. The image display region 12b is partially disposed on the display board 12a. The plurality of driver chips 13 is mounted on a part of the display board 12a where the image display region 12b is not disposed. In this way, a structure in which the driver chip 13 is directly mounted on the display board 12a of the OLED panel 12, is also referred to as COP (Chip On Panel).

The image display region 12b of the OLED panel 12 includes an electrode layer, an organic EL layer, and a sealing member etc. The electrode layer is, for example, a Thin Film Transistor (TFT) layer, and has a plurality of switching elements. The organic EL layer includes a plurality of pixels formed of an organic compound. The sealing member seals the electrode layer and the organic EL layer. The inside of the sealing member is, for example, in a vacuum state. The image display region 12b is configured to display a prescribed image when a current is supplied to each pixel included in the organic EL layer for light emission.

As illustrated in FIG. 3, the opaque back sheet 11 is provided on the backside of the OLED panel 12. An OCA (Optical Clear Adhesive) 17 and a cover film 18 are provided on the front side of the OLED panel 12. It is to be noted that the "backside of the OLED panel 12" is a side where the display board 12a is disposed, and the "front side of the OLED panel 12" is a side where the image display region 12b is disposed. A user can visually recognize an image displayed on the image display region 12b through the cover film 18 and the OCA 17. Since the opaque back sheet 11 is provided, the image displayed on the image display region 12b can be easily visually recognized even though the display board 12a is transparent.

The cover film 18 is bonded and fixed to the OLED panel 12 by the OCA 17. The OCA 17 has transparency and adhesiveness. The OCA 17 can include, for example, a silicon-based adhesive. The cover film 18 is, for example, glass. A touch sensor layer may be provided between the cover film 18 and the OLED panel 12. In this case, the display unit 10 can be used as a touch panel. In addition, a polarizing plate etc. may be provided between the cover film 18 and the OLED panel 12.

As illustrated in FIG. 2, the plurality of driver chips 13 is arranged in the first direction X. The driver chip 13 causes the image display region 12b to display a prescribed image, by supplying a prescribed current to each pixel of the OLED panel 12. The driver chip 13 is, for example, an IC (Integrated Circuit). The driver chip 13 is connected to the relay board 15 by the connecting board 14. The connecting boards 14 are arranged in the first direction X according to the number and arrangement of the driver chips 13. Respective circuits of the plurality of connecting boards 14 are collected by the relay board 15 to be electrically connected to the one FPC 16.

Figure 4:
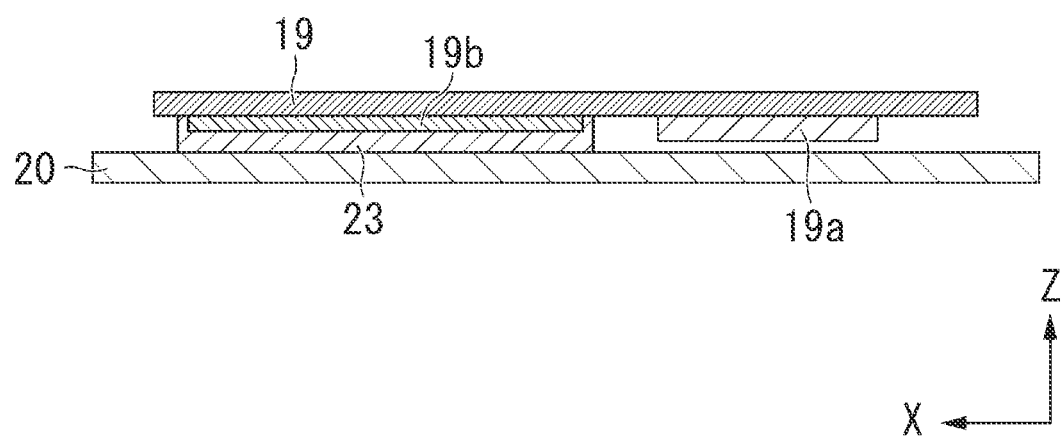
FIG. 4 is a cross-sectional view along an arrow IV-IV in FIG. 2.

The FPC 16 connects the relay board 15 and the board 19. The FPC 16 and the board 19 may be an integrally formed rigid flexible board. Alternatively, the FPC 16 and the board 19 may be separately formed and both may be connected by a connector or bonding etc. using an ACF (Anisotropic Conductive Film). As illustrated in FIG. 3 and FIG. 4, the board 19 is mounted with a non-volatile memory 19a and a second connector 19b. As the non-volatile memory 19a, for example, an EEPROM (Electrically Erasable Programmable Read-Only Memory) can be used. The non-volatile memory 19a is configured to store first correction data I1 and second correction data I2, pertaining to each pixel of the OLED panel 12.

The first correction data I1 is information for correcting a driving condition (for example, current value) of each pixel which information is created based on an initial state of each pixel of the OLED panel 12. It is possible to correct disturbance of an image due to manufacturing variations per pixel, by controlling a driving condition of each pixel of the OLED panel 12 using the first correction data I1.

The second correction data I2 is information for correcting a driving condition (for example, current value) of each pixel which information is created based on a usage status of each pixel. The "usage status" is a predicted value of deterioration, which is calculated from, for example, accumulated energizing time and luminance of each pixel. Although the organic compound included in the OLED panel 12 is deteriorated with lighting, a degree of a progress of deterioration varies depending on the usage status of each pixel. Then, it is possible to correct disturbance of an image due to the variation of the usage status of each pixel, by correcting a driving condition of each pixel of the OLED panel 12 using the second correction data I2.

The second connector 19b is connected to the first connector 23 of the control board 20. The second connector 19b and the first connector 23 are so-called B-to-B connectors and can connect the board 19 and the control board 20 so that the board 19 and the control board 20 face in their thickness directions. One of the connectors 19b and 23 is a plug side, and the other is a receptacle side. Either of the connectors 19b and 23 may be a plug side. The board 19 and the control board 20 are stored in the second chassis 1b. The control board 20 is connected to a mother board not illustrated.

As illustrated in FIG. 4, the non-volatile memory 19a is mounted on a surface of the board 19 facing the control board 20. In other words, the non-volatile memory 19a is disposed in a gap between the board 19 and the control board 20. This structure can reduce the thickness of the first chassis 1a in comparison with, for example, a case of mounting the non-volatile memory 19a on the relay board 15 etc.

As illustrated in FIG. 2, the control board 20 is mounted with a power supply unit 21 and a control unit 22, in addition to the first connector 23. The power supply unit 21 and the control unit 22 are, for example, an IC. The power supply unit 21 is configured to supply power for driving each pixel to the driver chips 13. The control unit 22 is configured to control a timing etc. of driving each pixel of the OLED panel 12. The control unit 22 and the non-volatile memory 19a are electrically connected through the connectors 19b and 23 etc. and communicate using, for example, an I2C interface. The control unit 22 controls the driver chips 13 based on the first correction data I1 and the second correction data I2 stored by the non-volatile memory 19a.

The FPC 16 electrically connects the relay board 15 disposed in the first chassis 1a and the board 19 disposed in the second chassis 1b. By passing the FPC 16 inside the hinge mechanism 1c, even when the first chassis 1a and the second chassis 1b relatively rotate, function of the electronic device 1 can be maintained. It is to be noted that the FPC 16 may be directly connected to the OLED panel 12 without the connecting board 14 and the relay board 15.

In this regard, as described above, the first correction data I1 and the second correction data I2 for correcting driving conditions of the OLED panel 12 are stored in the non-volatile memory 19a. These correction data I1 and I2 are created for each individual OLED panel 12. Therefore, when the OLED panel 12 is replaced, for example, in maintaining the electronic device 1, it is required to replace both the OLED panel 12 and the non-volatile memory 19a. If the non-volatile memory 19a is mounted on the control board 20, the control board 20 has to be entirely replaced together with the OLED panel 12 and thus it is hard to do maintenance work. In addition, the control board 20 that essentially needs not be replaced will be replaced, which is disadvantageous in terms of cost.

Therefore in the present embodiment, the display unit 10 has the OLED panel 12 and the non-volatile memory 19a and this display unit 10 is connected to the control board 20 through the second connector 19b. Thus, when the OLED panel 12 and the non-volatile memory 19a are replaced, the display unit 10 can be removed from the electronic device 1 by removing the second connector 19b from the first connector 23 of the control board 20. Maintenance workability is therefore improved. Further, if the display unit 10 is a Field Replacement Unit (FRU), costs can be reduced by not including the control board 20 in the FRU.

As described above, the electronic device 1 of the present embodiment includes the first chassis 1a, the second chassis 1b rotatable connected to the first chassis 1a through the hinge mechanism 1c, the display unit 10 having the OLED panel 12 stored in the first chassis 1a, and the control board 20 stored in the second chassis 1b and mounted with the control unit 22 configured to control driving of the OLED panel 12 and the first connector 23, in which the display unit 10 has the FPC 16 configured to electrically connect the OLED panel 12 and the control board 20, the non-volatile memory 19a configured to store the first correction data I1 based on an initial state and the second correction data I2 based on a usage status, pertaining to each pixel of the OLED panel 12, and the second connector 19b to be connected to the first connector 23.

According to the above-described configuration, it becomes possible to remove the display unit 10 including the OLED panel 12 and the non-volatile memory 19a without removing the control board 20 from the electronic device 1. Maintenance workability can therefore be improved.

In addition, the display unit 10 may have the board 19 mounted with the non-volatile memory 19a and the second connector 19b, and the board 19 may be stored in the second chassis 1b. In this case, it is possible to reduce the thickness of the first chassis 1a.

In addition, the FPC 16 and the board 19 may be an integrally formed rigid flexible board. In this case, it is possible to reduce the size in comparison with a configuration in which the FPC 16 and the board 19 are separately formed and these are connected by a connector etc.

It is to be noted that a technical scope of the present invention is not limited to the embodiment described above and can be variously modified without departing from the spirit of the present invention.

For example, the non-volatile memory 19a may be mounted on a part of the display unit 10 other than the board 19. Specifically, even if the non-volatile memory 19a is mounted on the relay board 15 or the connecting board 14, it is possible to achieve the effect of improving maintenance workability.

In addition, in the above-described embodiment, the non-volatile memory 19a and the second connector 19b have been mounted on the same board 19. However, a board (first board) mounted with the non-volatile memory 19a and a board (second board) mounted with the second connector 19b may be different and the display unit 10 may have these first board and the second board.

Additionally, it is possible accordingly to replace the elements of the above-described embodiment with known elements without departing from the spirit of the present invention, and the above-described embodiment and modifications may be combined as appropriate.

DESCRIPTION OF SYMBOLS electronic device
1a first chassis
1b second chassis
1c hinge mechanism
10 display unit
16 FPC
19 board
19a non-volatile memory
19b second connector
20 control board
23 first connector
I1 first correction data
I2 second correction data Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. An electronic device comprising:
a first chassis;
a second chassis rotatably connected to the first chassis through a hinge;
a display comprising an organic light-emitting diode (OLED) panel stored in the first chassis; and
a control board stored in the second chassis and mounted with a control unit that controls driving of the OLED panel and a first connector,
wherein the display further comprises:
a Flexible Printed Circuit (FPC) that electrically connects the OLED panel and the control board;
a non-volatile memory that stores first correction data based on an initial state of each pixel of the OLED panel and second correction data based on a usage status of each of the pixels of the OLED panel; and
a second connector connected to the first connector;
wherein the display including the OLED panel in the first chassis, the FPC, and the non-volatile memory is removable from the electronic device, without removing the control board in the second chassis, by disconnecting the first connector and the second connector.

2. The electronic device according to claim 1, wherein the display has a board mounted with the non-volatile memory and the second connector, and
the board is stored in the second chassis.

3. The electronic device according to claim 2, wherein the FPC and the board are an integrally formed rigid flexible board.

* * * * *